United States Patent [11] 3,607,697

[72] Inventors George A. Shirn
Williamstown;
Alan Janus, Charlemont, both of Mass.
[21] Appl. No. 722,447
[22] Filed Apr. 18, 1968
[45] Patented Sept. 21, 1971
[73] Assignee Sprague Electric Company
North Adams, Mass.

[54] SPUTTERING PROCESS FOR MAKING A FILM OF SILICA AND SILICON NITRIDE
3 Claims, 2 Drawing Figs.

[52] U.S. Cl. .................................................. 204/192,
117/106 R, 317/234 R
[51] Int. Cl. ....................................................... C23c 15/00
[50] Field of Search ........................................... 204/192

[56] References Cited
UNITED STATES PATENTS
3,287,243  11/1966  Ligenza ......................... 204/192
3,324,019  6/1967   Laegreid et al. ............... 204/192

OTHER REFERENCES

Hu et al., " Silicon Nitride Films by Reactive Sputtering," J. E. Chem. Soc. 8/67 pgs. 826– 833

Doo et al., " Preparation and Properties of Pyrolytic Silicon Nitride," J. of Electrochemistry, Vol. 113 No. 12 pg. 1279– 1281, 12/1966.

*Primary Examiner*—Howard S. Williams
*Assistant Examiner*—Sidney S. Kanter
*Attorneys*—Connolly and Hutz, Vincent H. Sweeney, James P. O'Sullivan and David R. Thornton ABSTRACT: Formation of a sputtered film on a silicon substrate, said film being a graded composition ranging from pure $SiO_2$ to pure $Si_3N_4$ and the composition resulting therefrom.

3,607,697

SPUTTERING PROCESS FOR MAKING A FILM OF SILICA AND SILICON NITRIDE

BACKGROUND OF THE INVENTION

This invention is concerned with film formation and more particularly with a graded film of $SiO_2$ and $Si_3N_4$ on a silicon substrate.

It has been found that a major problem with thermally grown $SiO_2$ films for field effect devices is their permeability to certain deleterious ions, notably sodium ions. Silicon nitride, $Si_3N_4$, has been tried as a substrate for silicon dioxide because it is known to be less permeable to alkali metal ions, oxygen, water vapor and hydrogen. Unfortunately, $Si_3N_4$ is apparently subject to electron and/or hole injection from the silicon. In both cases, electron and hole injection, the space charges which move around in the insulator are detrimental to the operation of the device.

It is an object of the invention to present a process for preparing a compound layer on silicon which is impervious to or a trap for deleterious impurities.

Another object of the invention is to present a novel sputtered film on silicon.

SUMMARY OF THE INVENTION

The present invention involves a method of forming a sputtered film on a silicon substrate, said film being a graded composition ranging from pure $SiO_2$ to pure $Si_3N_4$. The invention also involves the structure resulting from this process.

DETAILED DESCRIPTION OF THE INVENTION

In accordance with the invention, a polycrystalline silicon target is positioned within a bell jar or in some other suitable chamber which permits confinement and control of a particular atmosphere. The silicon target is held in place by any suitable metal holder and an RF power supply is contacted to this holder. A single crystal silicon wafer is positioned opposite and parallel to the target and held in place by holder which is insulated from the metal base of the bell jar.

Figure 1:
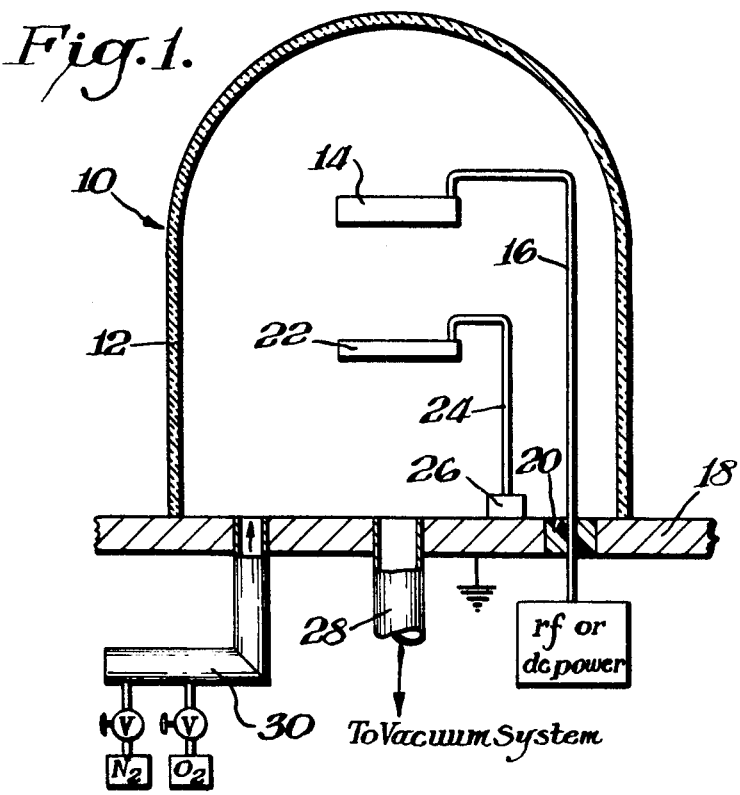
FIG. 1 of the drawing shows a sputtering apparatus 10 having a bell jar 12 containing a polycrystalline silicon target 14. The target is held by and RF or DC power is transmitted through a holder 16. Holder 16 is insulated from grounded bell jar base 18 by insulator 20. A silicon single crystal wafer 22 is supported beneath target 14 by support member 24. Member 24 is insulated from base 18 by insulator 26. Exit line 28 leads to a vacuum system (not shown). A lead-in line 30 accommodates the entry of either or both of nitrogen and oxygen from sources $N_2$ and $O_2$.
Figure 2:
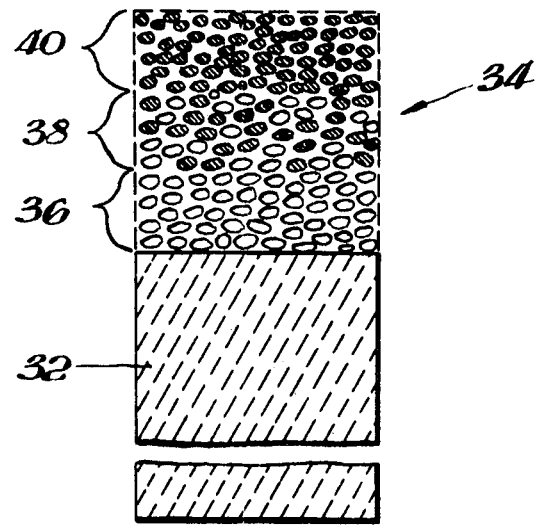
FIG. 2 represents a cross sectional view of silicon substrate 32 upon which is deposited graded layer 34 consisting of a region 36 of pure $SiO_2$ a region 38 of mixed $SiO_2$ and $Si_3N_4$ and a region 40 of pure $Si_3N_4$. For purposes of differentiation, the $Si_3N_4$ particles have been crosshatched while the $SiO_2$ particles have not.

The air in the bell jar is evacuated to a low pressure and then replaced by bleeding in oxygen at a pressure within the range of $10^{14}$ to $5\times10^{14}$ Torr (gauge). The pressure is then increased to within the range of $10^{13}$ to $5\times10^{13}$ Torr by throttling or partially closing a valve in the vacuum system. The RF power is turned on and the silicon target is reactively sputtered with oxygen for a period of from 10 to 30 minutes. During this period $SiO_2$ is deposited on the surface of the single crystal silicon substrate. This deposited film corresponds to region 36 of FIG. 2.

While sputtering is continued, a slow changeover from oxygen to nitrogen is begun. As nitrogen is slowly introduced into the oxygen stream, the oxygen input is correspondingly reduced. As the changeover from $O_2$ to $N_2$ proceeds, the silicon target is reactively sputtered with an increasing concentration of nitrogen ions and a decreasing concentration of oxygen ions. As a result, the film being deposited becomes progressively enriched with $Si_3N_4$ until the end of the changeover, at which time only $Si_3N_4$ is being deposited. While the changeover is occurring, care should be exercised to maintain the pressure as close to the starting pressure as possible. The switchover from $O_2$ to $N_2$ should take from 5 to 20 minutes. Thereafter, sputtering with nitrogen alone is continued for 10 to 30 minutes at the original pressure. During sputtering the RF power should be held at 13 mHz. industrial band and about 450 to 600 watts RF power. It is to be understood that a DC power source (triode sputtering) can also be used. When using DC power the limitations are 900–1200 volts on target, 2–5 amperes in auxiliary beam.

EXAMPLE

A graded $SiO_2Si_3N_4$ film is deposited on a silicon substrate in the following manner: A polycrystalline silicon target, 3 inches in diameter and 1 inch thick, is supported in a bell jar by a metallic holder adapted to transmit RF power to the target. A single crystal wafer of silicon, 1¼ inch in diameter and 0.010 inch thick, is supported about 2 inches from the target by a holder which is insulated from the grounded base of the bell jar. Air is evacuated to a low pressure and then displaced by introducing oxygen at $1\times10^{14}$ Torr (gauge). The bell jar oxygen pressure is then increased to about 1 $\mu$ by closing a valve in the evacuating mechanism. The RF power is adjusted to about 500 watts and the silicon target is reactively sputtered for about 10 minutes. During this step in the process $SiO_2$ is deposited on the surface of the single crystal silicon substrate. While sputtering is continued, nitrogen is slowly introduced into the oxygen stream and the oxygen input is simultaneously reduced by a corresponding amount. While the changeover from $O_2$ to $N_2$ is occurring, care is exercised to maintain the pressure at about 1 $\mu$. During this step in the process, the film being deposited becomes progressively enriched with $Si_3N_4$ until the end of the changeover, at which time $Si_3N_4$ is being deposited. The changeover is completed in about 15 minutes. Sputtering with nitrogen alone, at about 1 $\mu$ pressure is continued for about 20 minutes in order to deposit only $Si_3N_4$ on the graded film. The completed film on the silicon substrate begins as pure $SiO_2$ and progressively diminishes in $SiO_2$ concentration, while progressively increasing in $Si_3N_4$ concentration to an outermost region of pure $Si_3N_4$. The overall film thickness is about 2250 A.

Since it is obvious that many changes and modifications can be made in the above-described details without departing from the nature and spirit of the invention it is to be understood that the invention is not limited to said details except as set forth in the appended claims.

1. A method of depositing a graded composition ranging from pure $Sio_2$ to pure $Si_3N_4$ on a silicon substrate comprising: (a) RF or DC reactively sputtering a silicon target in an oxygen atmosphere so as to deposit on a single crystal silicon substrate a first region of $SiO_2$; (b) while continuing the sputtering, effecting a gradual changeover from oxygen to nitrogen so as to deposit on said first region a second region which in cross section is progressively richer in $Si_3N_4$; and (c) continuing the sputtering in nitrogen alone so as to deposit on said second region a third region of pure $Si_3N_4$ 2. The method of claim 1 wherein said silicon target is polycrystalline silicon.

3. The method of claim 1 wherein the pressure during sputtering is maintained between $10^{13}$ and $5\times10^{13}$ Torr.